United States Patent Office 3,342,668
Patented Sept. 19, 1967

3,342,668
PROCESS FOR PRODUCING INSCRIPTIONS AND DECORATIONS ON PLATES OF ACRYLIC RESINS AND DERIVATIVES, DIRECT DURING THEIR FORMATION, AND PLATES SO PRODUCED
Antonio Dario, Via Borgonuovo 10, Milan, Italy
No Drawing. Filed Mar. 29, 1963, Ser. No. 269,173
Claims priority, application Italy, Apr. 3, 1962, Patent 665,973
2 Claims. (Cl. 161—242)

The by now generalized use of plates of acrylic resins and derivatives thereof is well known, since said plates combine with extreme lightness and elasticity the same characteristics of sturdiness and unalterability of the products of the glass industry.

The process for making them also is well-known, i.e., between two plate glasses conveniently spaced there is cast a mixture of acrylic resins or derivatives, which once they are brought to the temperature necessary for condensation, polymerize to form the desired product.

The plate having thus been obtained, to provide decorations or inscriptions thereon the method used until now is to paint one side of the plate with resin, painting thereon the desired subjects, which then can be observed by transparence on the other side of the plate.

Obviously in this manner, since the paint is exposed to the atmospheric agents and to the wear of time, a delicate and easily deteriorated product is obtained. Moreover, for the reasons stated above, it is possible to decorate only one side of the plate, permitting observation thereof from the other side.

The process according to the present invention avoids the cited inconveniences in that it provides plates directly decorated during their formation, which therefore are perfectly finished.

The instant process essentially consists in applying coloured paints reproducing the inscriptions and/or decorations on one or on both of the internal faces of the plates forming the cell for the casting and the polymerization of the acrylic resin, in pouring subsequently into the cell so prepared the acrylic resin and in subjecting the cell with resin to the treatment known per se for the polymerization of said resin, whence the paints reproducing the inscription and/or decorations become detached from the plate of the cell and become incorporated forming one unit with the resin plate so obtained.

Said paints should be stable with respect to the polymerizing resin mixture but at least permeable to said mixture, in such a way as to become perfectly incorporated during the polymerization.

As paints suitable for the purpose it is possible to employ these constituted by organic and/or inorganic pigments dispersed in solutions of resins which have the property of yielding films stable under the action of acrylic materials or derivatives during polymerization.

So for instance it is possible advantageously to employ as inorganic pigments the oxides of iron, cadmium, chromium, titanium and other metals, as well as sulfides, chromates and metal sulfates, while as organic pigments it is possible advantageously to employ phthalocyanines, oxynaphthenes and anthraquinone derivatives.

As solvents, well suited for the purpose are aliphatic and aromatic hydrocarbons, saturated and unsaturated, or mixtures thereof, and halogenated hydrocarbons, and in particular white spirit, heptane, benzene and trichloroethylene.

Among the resins composing the paints, particularly suited are those containing unsaturation and those which are insoluble in acrylic monomers or derivatives. In particular it is advantageous to use resins belonging to the group of isomerized rubbers.

The instant process is more fully made clear by the following example:

EXAMPLE

A dispersion is prepared of 50 parts of chromium oxide in 50 parts of modified isomerized rubber known by the trade name Resiprene 35 RA (a cyclized rubber), and the paint so obtained is diluted with white spirit until it has an appropriated fluidity for the application of inscriptions and/or decorations by means of the paint-(screen)-process, on the inner walls of the polymerization cells.

After the figure impressed has dried, the cell is made up, the acrylic resin is poured and the known polymerization treatment is carried out. When the polymerization has taken place, the acrylic resin plate so formed shows reproduced at its surface the inscriptions or decorations which has been transferred from the glass plates of the cell and have been incorporated in the acrylic plate. The decorations appear particularly brilliant, resisting wear and atmospheric agents.

The advantages of the process described are many. In fact the decorated surface presents characteristics of mechanical and chemical resistance equal to those of the material constituting the very plate. So for instance the resistance against abrasion and against the atmospheric agents of the decorated part is not lower than that of the non-decorated surface.

Another advantage is represented by the fact that the decorated plate can be further formed or moulded without altering the decorations by any means. For that purpose there are employed, without any particular precaution, the moulding methods commonly used for acrylic plates and derivatives.

Moreover, with the process described, the decorated parts have the same well-known and valuable features of brilliancy and polish of acrylic plates and derivatives. Apparently, by operating according to the process described, it is also possible to obtain background decorations over the whole surface.

I claim:
1. A process for the production of decorated plates of acrylic resins by casting which comprises applying a paint consisting of at least one pigment dispersed in a solution of isomerized rubber in a solvent to at least one of the internal surfaces of a cell for the casting and polymerization of the acrylic resin, subsequently pouring the unpolymerized acrylic resin into the cell and polymerizing the acrylic resin in the cell.

2. A decorated plate of acrylic resin obtained by the process of claim 1.

References Cited

UNITED STATES PATENTS

| 1,742,516 | 1/1930 | Mills | 264—132 |
|---|---|---|---|
| 3,085,295 | 4/1963 | Pizzino et al. | 264—272 XR |

FOREIGN PATENTS

| 560,184 | 3/1944 | Great Britain. |
|---|---|---|

ROBERT F. WHITE, *Primary Examiner.*
T. J. CARVIS, *Assistant Examiner.*